Aug. 25, 1964  P. GANCEL  3,145,806
SPOT TYPE DISC BRAKES
Filed Nov. 6, 1961  2 Sheets-Sheet 2
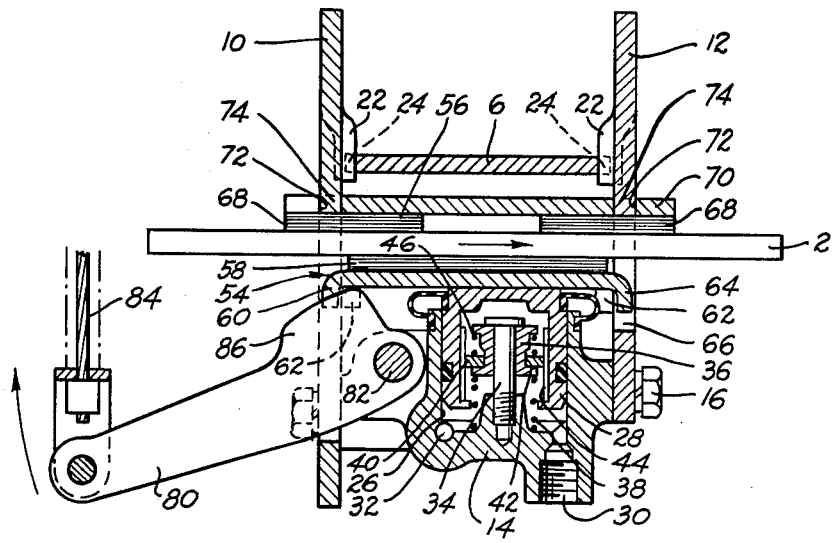
FIG_3
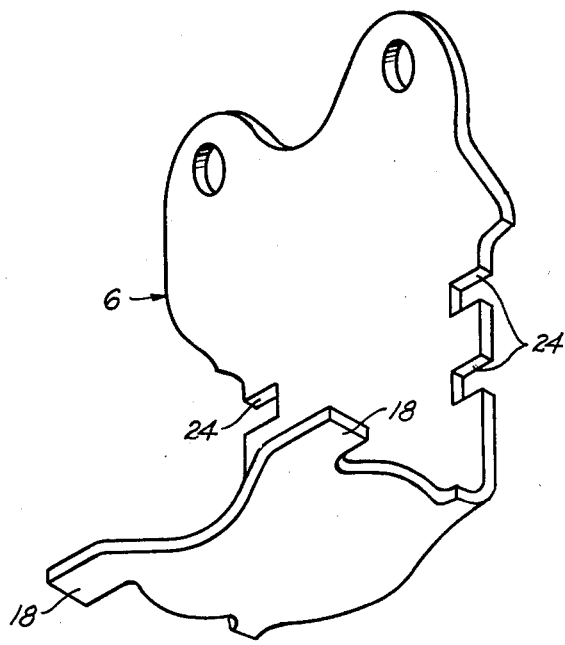
FIG_4
INVENTOR.
PIERRE GANCEL.
BY
ATTORNEY.

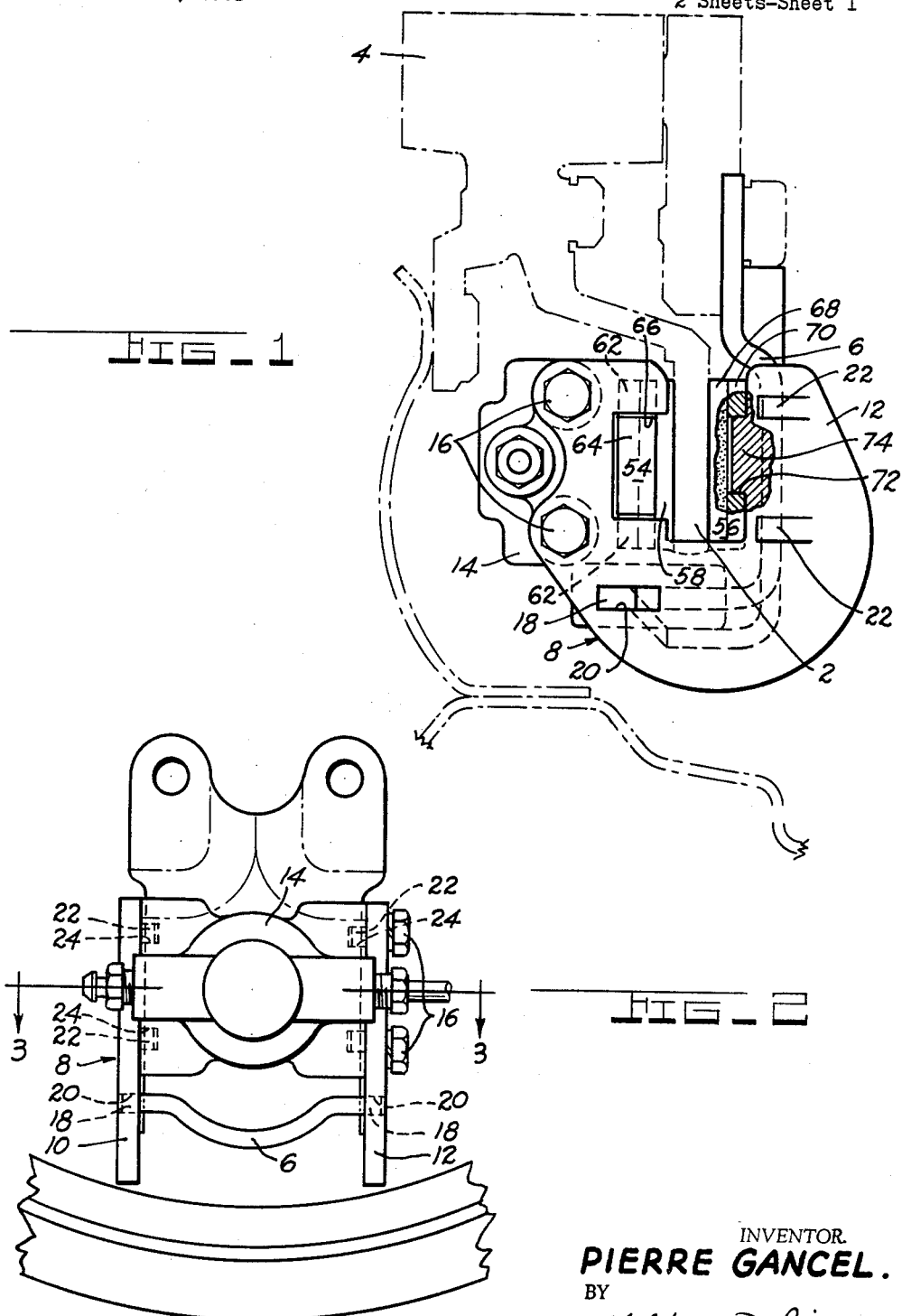

3,145,806
SPOT TYPE DISC BRAKES
Pierre Gancel, Levallois, France, assignor to Societe
Anonyme D.B.A., Paris, France, a company of France
Filed Nov. 6, 1961, Ser. No. 150,508
Claims priority, application France Nov. 10, 1960
8 Claims. (Cl. 188—73)

The invention relates to disc brakes having a floating housing, and more particularly to brakes of this type comprising a first friction element, the displacement of which in the direction toward the disc corresponds to the displacement of the means of application, and a second friction element, the displacement of which in the direction toward the disc corresponds to the displacement of the housing, the two friction elements extending over only a sector of the disc.

More particularly, the present invention has for its object a disc brake in which the floating housing is comprised of two yoke members, straddling the disc, and interconnected by two brace members disposed on opposite sides of the disc, one of these brace members carrying the brake applying means.

Another object of the present invention is to bring to this type of brake, improvements including a simplified construction and a rational disposition of the parts allowing reduction in size and weight of the brake without diminishing its rigidity.

According to the invention, the brake is provided with a support plate which is generally L-shaped in section. The support plate comprises a portion generally parallel to one face of the disc, and has another portion which crosses the periphery of the disc in a direction generally transverse to the disc. The means for applying the friction elements is disposed, with respect to the disc, adjacent that face which is remote from the support plate portion which is generally parallel to the disc. This new position of the brake parts enables a substantial reduction of the width of the support plate without diminishing its rigidity since it is no longer necessary to provide openings in the support plate for passage of the brake applying means.

According to another characteristic of the invention, the actuating means may be both hydraulic and mechanical with the mechanical means comprising a lever pivotable on a cylinder block containing the hydraulic actuating means and which includes a cam in contact with that friction element which is movable with respect to the floating housing.

According to another characteristic of the invention, the yoke members have stamped portions forming embossments which are received in guiding slots provided in the edges of the support plate.

The invention will be better understood from a consideration of the following description which refers to the accompanying drawings, in which:

FIGURE 1 is a side elevation view of a disc brake in accordance with the invention;

FIGURE 2 is a rear elevation view of the brake shown in FIGURE 1;

FIGURE 3 is a view in cross section taken along line 3—3 of FIGURE 2; and

FIG. 4 is a view in perspective of the support plate of the brake shown in FIG. 1.

In the embodiment illustrated by way of an example in the drawings, the brake which is intended to stop the rotation of the wheel of a vehicle, comprises, essentially a rotating disc 2 fixed on the hub 4 of the wheel, a support plate 6 fixed on the spindle or the axle casing of the wheel, and a housing, designated in its entirety by the reference numeral 8, which is adapted to slide parallel to the axis of the wheel on the support plate 6. The support plate is generally L-shaped, its vertical branch being adjacent to one of the faces of the disc. The housing 8 comprises two yoke members 10 and 12, which may be formed of two C-shaped metal sheets, connected by the body of a fluid pressure motor or a cylinder block 14 placed, with respect to the disc 2, on the side remote from the vertical branch of the support plate 6. The yoke members 10 and 12 are fixed to the cylinder block 14 by bolts 16.

The two yoke members 10 and 12 are disposed on either side of the support plate 6, substantially perpendicular to the latter, and are supported by lugs 18, provided on the horizontal branch of the support plate, which are lodged in elongated slots 20 in the yoke members 10 and 12. The length of these slots are greater than the width of the lugs 18 in order to permit the axial displacement of the housing 8 with respect to the support plate 6. Stamped embossments 22, which are located on the sides of the yoke members adjacent to the vertical branch of the support plate, slide in notches 24 cut into the support plate, and serve to support the housing 8 and to guide it in its axial displacement.

The cylinder block 14 is provided with a bore 26, in which a piston 28 moves when activated by fluid under pressure admitted through an orifice 30 at the base of the cylinder. The cylinder is also provided with a bleed hole 32.

An automatic adjusting device is interposed between the piston 28 and the cylinder block 14. This device comprises a rod 34 disposed along the axis of the bore 26, the threaded extremity of which is screwed into the bottom of the cylinder. A sleeve 36, slidable on the rod 34, is pushed against the head of the latter by means of a spring 38. A ring 40, disposed in an annular groove 42 provided on the sleeve 36, is friction mounted in a bore 44 of the piston 28. The axial width of the groove 42 is greater than the thickness of the ring 40, whereby the latter is permitted to move axially with respect to the sleeve. A spring 46 pushes the ring 40 against the edge of the groove 42 which is farthest from the head of the piston 28.

This adjusting device functions as follows: when the fluid is admitted under pressure into the bore 26, the piston moves away from the bottom of the bore carrying the ring 40 which compresses the spring 46. If the amplitude of displacement of the piston does not exceed the clearance between the ring 40 and the groove 42, the ring 40 will not move with respect to the piston due to the friction force of the ring on the wall of the bore 44 being greater than the force of the spring 46. When the fluid pressure in the bore decreases sufficiently, the piston 28 is returned to its original position by the spring 46. If due to wear of the linings the piston 28 moves a distance greater than the clearance existing between the ring 40 and the groove 42, the ring 40 will abut against the edge of the groove 42 which is nearest to the piston head. The force exerted by the fluid under pressure will be much greater than the friction force of the ring 40 on the wall of the bore 44 and relative movement will occur between piston 28 and the ring 40 to permit the friction pads to come into engagement with the disc 2. When the pressure of the fluid in the bore 26 decreases, the piston 28 returns under the action of the spring 46 by an amount equal to the clearance between the ring 40 and the groove 42, no matter what the original amplitude of displacement of the piston. The spring 38 is designed to permit the elastic backward displacement of the piston 28 by an amount greater than the provided clearance between the ring and the groove, the force of this spring being less than the friction force of the ring 40 on the wall of the bore 44 so as to permit the displacement, as a unit, of the assembly piston-ring-sleeve and to return the assembly to its original position with the sleeve 36 abutting against the head of the pin 34.

The two yoke members 10 and 12 carry the friction pads 54 and 56, which are disposed on opposite sides of the disc 2. The pad 54 comprises a friction lining 58 fixed on a plate 60, the extremities of which are folded in and over to form terminal edges 62 which bear on one or the other of the yoke members 10 and 12 depending upon the rotative sense of the disc 2 during brake application. The pad 54 is guided in its displacement perpendicular to the disc 2 by ears 64 provided at each extremity of the pad and slidable in openings 66 cut into the yoke members 10 and 12. The friction pad 54 is applied to its opposing disc face by the piston 28.

The pad 56 comprises a friction lining 68 fixed to a plate 70. The plate 70 is not provided with friction lining in its central portion, as shown in FIG. 3, in order to obtain a more uniform wearing of the lining, as explained hereinafter. The plate 70 is provided near its extremities with rectangular openings 72, in which are arranged mating tenons 74 provided on the adjacent branch of each of the yoke members 10 and 12 to form a thrust connection therebetween. The pad 56 is thus supported by the yoke members 10 and 12 and also serves as a brace member therefor.

The brake represented by way of example in the drawings comprises, in addition, a mechanical brake applying means which is superimposed on the hydraulic control. This mechanical brake applying means comprises a lever 80 pivotable around an axle 82 carried by the cylinder block 14. The free extremity of the lever 80 is connected by a cable 84 to a lever or a control pedal and the other extremity of the lever 80, which takes the form of a cam 86, comes into contact with the friction pad 54. The profile of the cam and the position of the axle 82 is selected in such a way that rotation of the lever 80 in the sense indicated by the arrow in FIG. 3, applies the pads to the disc 2.

The functioning of this type of brake is well known and will not be described in detail. It is sufficient to recall that when fluid under pressure is admitted into the bore 26, the force exerted on the piston 28 is transmitted directly to the pad 54 and the forces exerted on the bottom of the bore 26 is transmitted by the yoke members 10 and 12 to the pad 56. The two pads are thus applied to the opposite faces of the disc 2 with equal forces and, as a result, the disc is not subjected to any axial effort.

During braking, if it is assumed that the disc 2 turns in the direction indicated by the arrow in FIG. 3, the pad 54 is carried to the right and eventually bears, by the intermediary of its edges 62, on the yoke member 12. The circumferential effort to which the pad 54 is submitted is thus transmitted to the yoke member 12, then to the yoke member 10 by the intermediary of the cylinder block 14 and the pad 56 serving as a brace member, and finally to the support plate 6 on which the yoke member 10 bears. The circumferential effort to which the pad 56 is submitted is directly transmitted to the yoke member 10, then to the plate support 6.

The application effort of the pad 56 is localized near its extremities since it is transmitted by the yoke members 10 and 12. The pressure on the friction lining and, as a result, wearing of the lining is much less at the center than near the edges. It is in order to obtain substantially uniform wearing of the friction lining of the pad 56, that the central portion of this pad is not provided with lining.

To obtain uniform wearing of the lining 58 of the pad 54, it is possible to offset, in a convenient direction, the axis of the bore 26 with respect to the geometric center of the lining 58 so that the point of application of the resultant of the efforts exerted by the piston 28 on the pad 54 is radially and/or circumferentially offset with respect to the geometric center of the lining 28.

The mechanical brake applying means acts according to the same principle as the hydraulic brake applying means. When the lever 80 is displaced in the direction of the arrow in FIG. 3, the cam 86 applies the pad 54 against the adjacent face of the disc and the reaction force exerted by the lever on the axle 82 is transmitted to the pad 56 by the intermediary of yoke members 10 and 12. The fact that the cam of lever 80 bears against only one of the extremities of the pad 54 is not disturbing since the mechanical control is utilized, in general, only to maintain the vehicle halted.

The invention is particularly advantageous in its application to braking of automobile vehicles, since the brake of the invention is reduced in size and weight and lends itself to economical use of the available space inside of a wheel, as is evident from FIG. 1.

It is obvious that the invention is not limited to the particular embodiments described above and is represented in the drawings by way of example. It must be understood that the present invention extends to all mechanical equivalent devices.

What is claimed is:

1. A disc brake comprising: a rotor having opposed friction surfaces thereon, a fixed support member having one portion extending opposite one rotor friction surface and another portion extending in a transverse direction across the periphery of said rotor friction surfaces, said support terminating at a location spaced from the other rotor friction surface, a pair of circumferentially spaced yoke members straddling said rotor, means slidably securing each yoke member to said one portion of said support member on one side of said rotor and to a portion of said support member on the other side of said rotor, a pair of friction members, one of said friction members being located between said one friction surface and said one portion of said support member, means operatively connecting said one friction member to said yoke members for movement therewith toward said one friction surface of said rotor for engagement therewith, actuating means secured to said yoke members opposite said other friction surface of said rotor, the other of said friction members being located between said actuating means and said other friction surface, means slidably securing said other friction member to said yoke members, means operatively connecting said actuating means with said other friction member, whereby upon brake application said actuating means will thrust said other friction member into engagement with its respective friction surface and further application of said actuating means will effect sliding of said yoke members on said support member to bring said one friction member into engagement with its respective friction surface.

2. The structure as recited in claim 1 wherein said actuating means is hydraulic.

3. The structure as recited in claim 1 wherein said actuating means in mechanical.

4. The structure as recited in claim 1 wherein said means for slidably securing said yoke members to said support member comprises tab and slot connections.

5. The structure as recited in claim 1 wherein said one friction member comprises a backing plate with friction lining means attached thereto, and said means for connecting said one friction member to said yoke members comprises slots in said backing plate and portions projecting from each of said yoke members toward said backing plate, said yoke member projecting portions being received in said slots for forming a thrust connection between said yoke members and said one friction member.

6. A disc brake comprising: a rotor having opposed friction surfaces thereon, a fixed support member having one portion extending opposite one rotor friction surface and another portion extending in a transverse direction across the periphery of said rotor friction surfaces, said support terminating at a location spaced from the other rotor friction surface, a pair of circumferentially spaced yoke members straddling said rotor, means slidably securing each yoke member to said one portion of said support member on one side of said rotor and to a portion of said support member on the other side of said rotor, a pair of friction members, one of said friction members being located between said one friction surface and said one portion of said support member, means operatively connecting said one friction member to said yoke members for movement therewith toward said one friction surface of said rotor for engagement therewith, a fluid motor housing located between said yoke members and secured thereto opposite said other friction surface of said rotor, a fluid pressure responsive element mounted in said motor housing for movement toward and away from said other friction surface, the other of said friction members being located between said fluid motor housing and said other friction surface, means slidably securing said other friction member to said yoke members, means operatively connecting said fluid pressure responsive element with said other friction member whereby upon brake application said actuating means will thrust said other friction member into engagement with its respective friction surface and hydraulic reaction will effect sliding of said yoke members on said support member to bring said one friction member into engagement with its respective friction surface.

7. The structure as recited in claim 6 further including mechanical actuating means comprising lever means pivotally mounted to said fluid motor housing and having a cam for engaging said other friction member, a slot in one of said yoke members, said lever means having its input end extending from said housing through said slot.

8. The structure as recited in claim 6, said means for slidably securing said other friction member to said yoke members comprising a slot in each of said yoke members and a pair of circumferentially spaced ears extending from said other friction member, each of which is slidably received within a respective one of said slots, mechanical actuating means comprising a lever pivotally mounted to said fluid motor housing and having a cam surface engaging said other friction member, said lever having its input end extending from said housing through one of said slots.

References Cited in the file of this patent

UNITED STATES PATENTS

| 2,820,530 | Chouings et al. | Jan. 21, 1958 |
| 2,843,225 | Miller | July 15, 1958 |
| 2,862,580 | Burnett | Dec. 2, 1958 |
| 2,862,581 | Lucien | Dec. 2, 1958 |
| 2,926,757 | Armstrong | Mar. 1, 1960 |
| 2,948,356 | Butler | Aug. 9, 1960 |
| 3,035,644 | Desvignes et al. | May 22, 1962 |

FOREIGN PATENTS

| 551,076 | Italy | Nov. 15, 1956 |
| 800,832 | Great Britain | Sept. 3, 1958 |
| 861,648 | Great Britain | Feb. 22, 1961 |
| 1,174,269 | France | Nov. 3, 1958 |
| 1,180,633 | France | Jan. 5, 1959 |